(12) United States Patent
Shepard et al.

(10) Patent No.: US 11,693,755 B2
(45) Date of Patent: Jul. 4, 2023

(54) OPTIMIZING HARDWARE REPLACEMENT USING PERFORMANCE ANALYTICS

(71) Applicant: Microsoft Technology Licensing, LLC, Redmond, WA (US)

(72) Inventors: Marc Shepard, Bellevue, WA (US); Brad R. Anderson, Redmond, WA (US); Brett D. A. Flegg, Redmond, WA (US); David C. James, Snohomish, WA (US); Jason R. Githens, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 748 days.

(21) Appl. No.: 16/389,909

(22) Filed: Apr. 19, 2019

(65) Prior Publication Data

US 2020/0334122 A1 Oct. 22, 2020

(51) Int. Cl.
*G06F 11/34* (2006.01)
*G06N 20/00* (2019.01)
(Continued)

(52) U.S. Cl.
CPC ...... *G06F 11/3419* (2013.01); *G06F 11/3065* (2013.01); *G06N 20/00* (2019.01); *G06F 8/65* (2013.01); *G06F 9/4401* (2013.01)

(58) Field of Classification Search
CPC ............. G06F 11/0793; G06F 11/3065; G06F 11/3089; G06F 11/3419; G06F 11/3452;
(Continued)

(56) References Cited

U.S. PATENT DOCUMENTS 8,060,734 B1 * 11/2011 Newstadt .............. G06F 9/4406
713/1
2003/0204781 A1  10/2003 Peebles et al.
(Continued)

FOREIGN PATENT DOCUMENTS

KR  20090082242 A  *  7/2009  ............... G06F 9/48

OTHER PUBLICATIONS

"International Search Report and Written Opinion Issued in PCT Application No. PCT/US20/025613", dated Jun. 16, 2020, 11 Pages.
(Continued)

*Primary Examiner* — John H Le
(74) *Attorney, Agent, or Firm* — Barta, Jones & Foley, PLLC (57) ABSTRACT

A solution is disclosed for computer hardware replacement using performance analytics that selects replacement computer hardware based on actual user needs and enterprise priorities. Key performance data is collected and compared with various baselines, thereby identifying hardware that is performing below acceptable levels. Enterprise data and collected data are received from an instrumented operating system on a computing device. The collected data includes boot performance, application performance, and hardware performance. Based at least on the collected data, a usability score is determined by performing a weighted calculation on the collected data. Based at least on the usability score and the enterprise data, it is determined whether a score improvement is required. Based at least on the enterprise data, a score improvement selection is determined. The score improvement selection is reported based at least on determining that a score improvement is required.

20 Claims, 7 Drawing Sheets

(51) Int. Cl.
  *G06F 11/30* (2006.01)
  *G06F 8/65* (2018.01)
  *G06F 9/4401* (2018.01)
(58) Field of Classification Search
  CPC .. G06F 11/3466; G06F 21/552; G06F 9/4401; G06F 8/65; G06F 2201/81; G06N 20/00
  USPC ........................................................ 702/186
  See application file for complete search history.

(56) References Cited

U.S. PATENT DOCUMENTS

| | | |
|---|---|---|
| 2013/0085882 A1* | 4/2013 | Gounares ............ G06F 9/44505 705/26.1 |
| 2015/0227412 A1 | 8/2015 | Carmel et al. |
| 2017/0220404 A1* | 8/2017 | Polar Seminario .......................... G06F 11/0736 |
| 2017/0235622 A1 | 8/2017 | Boyapalle et al. |

OTHER PUBLICATIONS

"Notice of Allowance Issued in European Patent Application No. 20720298.7", dated Feb. 14, 2023, 7 Pages.

* cited by examiner

```
                                                                    300
// Calculation of user experience score (ue_score) for a device
ue_score = 0;
for each metric
 {
 z_score = min(5, max(-5,(instance - mean)/standard_ deviation));
 metric_value = (-1*z_score + 5/10);
 ue_score += metric_value * metric_weight;
 }
next metric;
return ue_score;
```

OPTIMIZING HARDWARE REPLACEMENT USING PERFORMANCE ANALYTICS

BACKGROUND

Typically, enterprises managing inventories of computing assets replace computer hardware on a fixed schedule to align with budget needs (e.g., if customer is on a three-year purchase cycle, a third of the computer hardware is replaced every year). This is inefficient for both information technology departments and end users, as some computer hardware may be operating satisfactorily upon replacement, with further years of potential satisfactory service lost, whereas other computer hardware may have become over-taxed and obsolete (for its intended use) long before a scheduled replacement. Additionally, computer hardware replacement procedures that are based solely on the age of assets, with standardized equipment for entire groups, produce suboptimal hardware choice that can either waste resources on some users while providing inadequate computing power for other users. Permitting users to select their own computer hardware from pre-approved options risks wasting resources when users each select the best available option—without taking into account enterprise budgeting constraints and priorities.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to a solution for optimizing computer hardware replacement using performance analytics that selects replacement computer hardware based on actual user needs and enterprise priorities. A tool collects key performance data to compare with various baselines, thereby identifying hardware that is performing below acceptable levels. Exemplary operations include receiving enterprise data and collected data from an instrumented operating system on a first computing device, the collected data including boot performance, application performance, and hardware performance; determining, based at least on the collected data, a usability score, wherein determining the usability score comprises performing a weighted calculation on the collected data; determining, based at least on the enterprise data, a score improvement selection; and reporting the score improvement selection.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

The disclosure optimizes computer hardware replacement using performance analytics to select replacement computer hardware based on actual user needs and enterprise priorities. A tool collects key performance data to compare with various baselines, thereby identifying hardware that is performing below acceptable levels. Exemplary operations include receiving enterprise data and collected data from an instrumented operating system (OS) on a first computing device, the collected data including boot performance, application performance, and hardware performance; determining, based at least on the collected data, a usability score, wherein determining the usability score comprises performing a weighted calculation on the collected data; determining, based at least on the usability score and the enterprise data, whether a score improvement is required; and reporting a score improvement selection based at least on the enterprise data and determining that a score improvement is required.

Examples of the tool capture key performance metric data for computing devices in an enterprise (e.g., various versions of computing device 700 of FIG. 7), including but not limited to, core boot time, other boot time, application startup time, login time, processor (e.g., CPU) utilization, memory utilization, battery life, battery warning history, storage input/output (I/O) performance, and network I/O performance. Data is sent to a service (e.g., a cloud service), where enterprise specific data is joined with anonymized data from other sources, and an adaptive algorithm is used to identify one or more of: (1) a prioritized set of devices to replace, (2) individualized replacement hardware selections, (3) a set of devices that are operating anonymously (e.g., outside of enterprise and/or global norms) and thus are likely have a hardware or software configuration issue, and (4) a customized report for information technology (IT) administrators that shows aggregated views down to detail views of how computer hardware is performing in the enterprise environment. Other output of the adaptive algorithm is contemplated, and within the scope of the disclosure.

Figure 1:
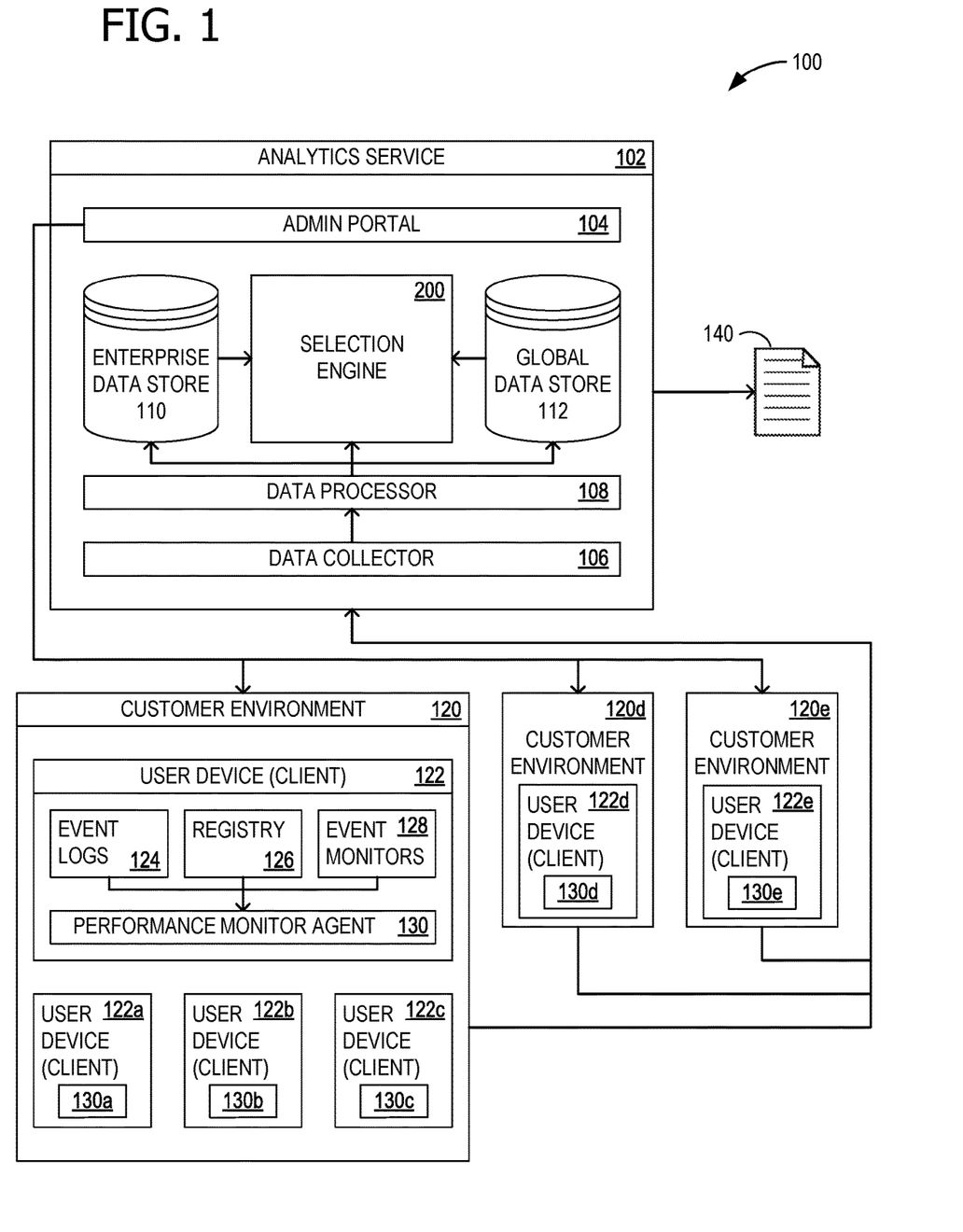
FIG. 1 illustrates an environment that can advantageously employ a tool for optimizing hardware replacement using performance analytics.

FIG. 1 illustrates an environment 100 that can advantageously employ a tool for optimizing hardware replacement using performance analytics. The tool comprises the combination of an analytics service 102 and a performance monitor agent 130. Analytics service 102 includes a selection engine 200 that is illustrated in greater detail in FIG. 2, for clarity.

Analytics service 102 receives and processes data that is collected from a user device 122 operating in a customer environment 120 by performance monitor agent 130 that is running locally on user device 122 to collect data about the performance of user device 122. Analytics service 102 also receives and processes data that is collected from other user devices 122*a*, 122*b*, and 122*c* operating in customer environment 120, and additionally from other user devices 122*d* and 122*e* operating in other customer environments 120*d* and 120*e*. Other user devices 122*a*-122*e* have their own local copies of performance monitor agents 130*a*-130*e*. In this manner, analytics service 102 receives, from a plurality of other performance monitor agents 130*a*-130*e*, collected data. Some examples of analytics service 102 run as a cloud service, for example on cloud resource 728 of FIG. 7. (See the description of FIG. 7 for more detail.)

An administrator portal 104 enables analytics service 102 to configure and maintain performance monitor agents 130 and 130*a*-130*e*, for example to specify collection criteria, update logic, and push installations, in some examples. Performance monitor agent 130 collects data from an instrumentalized OS and applications, specifically, data from event logs 124, a registry 126, and other event monitors 128 on user device 122. Performance monitor agents 130*a*-130*e* operate similarly to performance monitor agent 130. Examples of collected data include, but are not limited to, the following:

system boot time by phase (including core boot time);
login time by phase;
application startup time (e.g., the time from when an application launches to when the user is able to interact with the application);
total duration and number of times a processor utilization exceeds a threshold;
total duration and number of times a memory utilization exceeds a threshold;
total duration and number of times a memory I/O operation exceeds a threshold;
total duration and number of times a network I/O operation exceeds a threshold;
storage utilization;
user device utilization (e.g., the number of hours a user device is on and a user is interacting with the device);
battery utilization;
health indicators: frequency and count of unexpected reboots, anticipated battery life, anticipated hard drive life, driver and/or application crash frequency and count.

A usability score is determined as a weighted calculation (e.g., a weighted combination) of the collected data that includes one or more of the factors identified. More detail on calculation of a usability score is provided in relation to FIG. 3.

For example to measure boot time, boot tracing is enabled and begins logging events as soon as the OS can do so. Various stages are logged, and these logs are available in event logs 124 to measure boot performance of user device 122 from power-up to the appearance of the login screen. Core boot time is measured as a relatively consistent indicator of performance. Core boot time includes bringing up the OS and loading services. Also, the time between login and execution of the first application is measured and collected. Event logs 124 are parsed to ascertain boot time that is specific to the hardware, and so does not include delays introduced by user interaction. In general, core boot time is unaffected by other device customizations, such as installed applications and enterprise IT policy enforcements.

However, later boot stages are typically affected by device customizations. Fetching policies (e.g., when a user consent screen is displayed prior to allowing a user to access user device 122) can involve network latency, and so is generally not a good measure of the innate performance of user device 122. Additionally OS and application updates also drive widely varying delay times, and so may not be accurate metrics for device characterization. Thus, by performing log parsing, some factors outside the control of the hardware can be omitted from the usability score. Login time, the time from a user entering a password until the user can launch an application is also collected.

Applications are also instrumented to determine startup time, which is the time from the user selecting the icon (e.g., by tapping or clicking with a pointing device) and when the application is ready to use. In some examples, this is accomplished efficiently by detecting that a new application window has opened and then determining how long ago the process that spawned the new application window had started. Since users typically notice only foreground applications, with which the users interact, application startup time is not measured for some or all background processes, in some examples. Collected battery data may include a count number of times low battery warning is displayed (battery warning history), which indicate whether battery capacity is sufficient for the user. Other battery data collected, by some examples, includes how long a user can use user device 122 between charges. CPU and memory spikes above thresholds are also collected, because such incidents are likely noticed by users. In some examples, thresholds of 75% or 80% are used for processor utilization and memory utilization. Storage I/O performance and network I/O performance, such as lag times are collected in some examples. This collected data indicates specific hardware performance, but when combined with or compared with enterprise data, the collected data can be used to determine whether the performance is acceptable or instead whether improvement is suggested and/or required. Thus, performance monitor agent 130 is operative to collect data from an instrumented OS on a computing device (e.g., user device 122).

Figure 7:
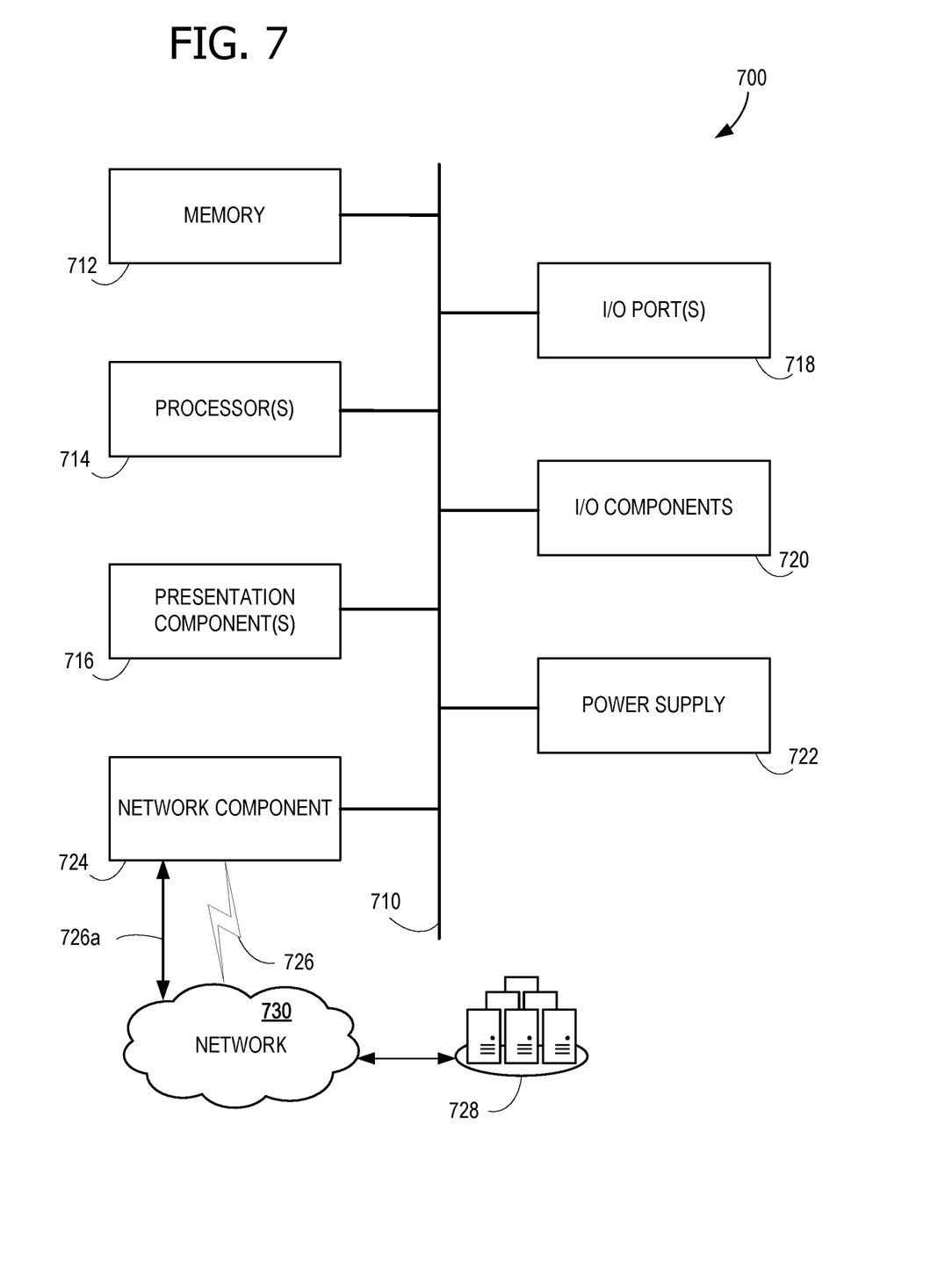
FIG. 7 is a block diagram of an example computing environment suitable for implementing some of the various examples disclosed herein.

The data is sent by performance monitor agent 130 to analytics service 102, for example over network 703 (described in more detail in relation to FIG. 7). A data collector 106 within or associated with analytics service 102 receives the data from performance monitor agent 130 and other performance monitor agents 130*a*-130*e*. A data processor 108 anonymizes a copy of the collected data. In some examples, data processor 108 operates within customer environment 120, to permit the customer maximum control over potentially sensitive data. In some examples, data processor 108 operates as a cloud based service. Data processor 108 then has a copy of collected data 230 from performance monitor agent 130 and a copy of anonymized collected data 232 from performance monitor agent 130 and other performance monitor agents 130*a*-130*e*. Data processor 108 also has a copy of non-anonymized collected data, that is equivalent to collected data 230, from other performance monitor agents 130*a*-130*e*. Data processor 108 furnishes collected data 230 and anonymized collected data 232 to selection engine 200. In some examples, data processor 108 furnishes collected data 230 to an enterprise data store 110, and furnishes anonymized collected data 232 to a global data store 112.

Enterprise data store 110 incorporates collected data 230, along with equivalents of collected data 230 from other user devices 122*a*-122*c* into enterprise data, specifically in hardware baselines 234. Global data store 112 incorporates anonymized collected data 232 into global hardware baselines 240 as aggregate performance metrics. In some examples, anonymized collected data 232 is converted into aggregate performance metrics by data processor 108. A particular operating entity, such as an enterprise has a need to know how its own specific computing devices operate relative to other computing devices, such as other computing devices owned and operated by others. However, while one particular operating entity may benefit from having comparison data for computing devices owned and operated by others, there is no need to share certain details. Thus, only anonymized data is shared and used for global performance metric comparisons. This permits collected data 230 to be used in multiple ways: specific comparison with enterprise data, and also comparison with global averages.

Figure 2:
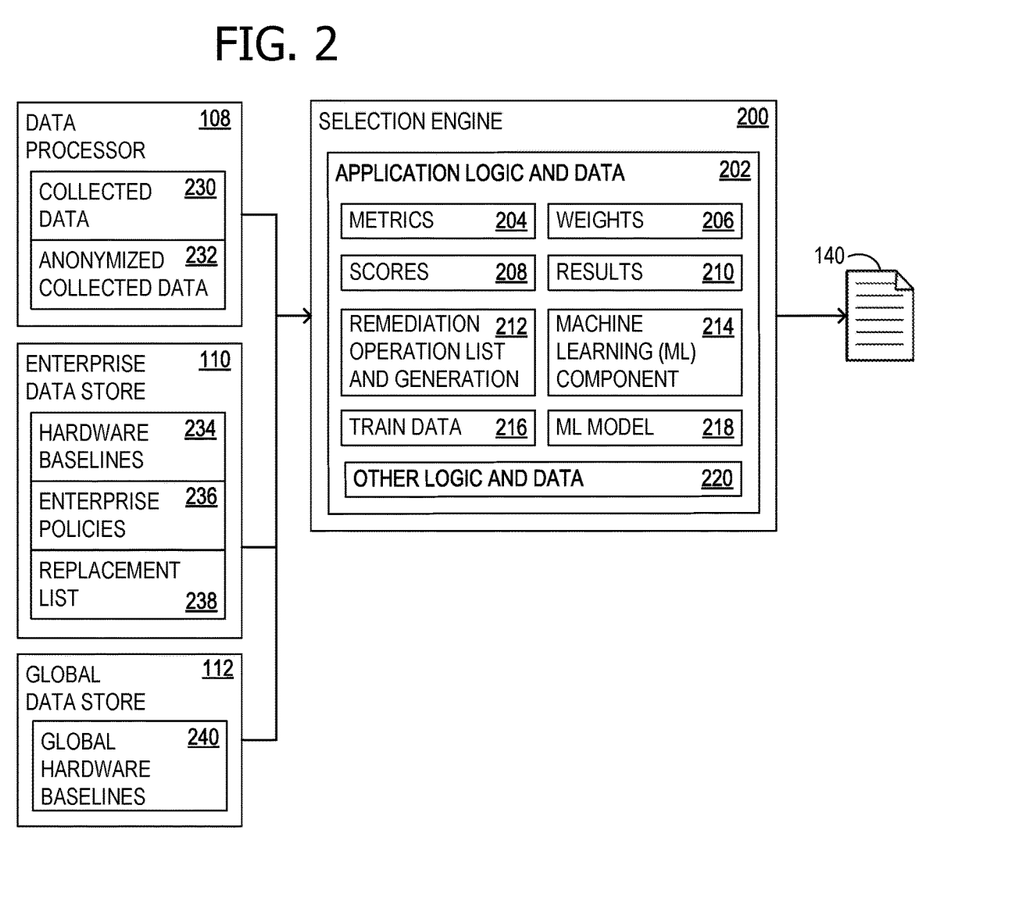
FIG. 2 illustrates an exemplary selection engine of use in the environment of FIG. 1.
Figure 4:
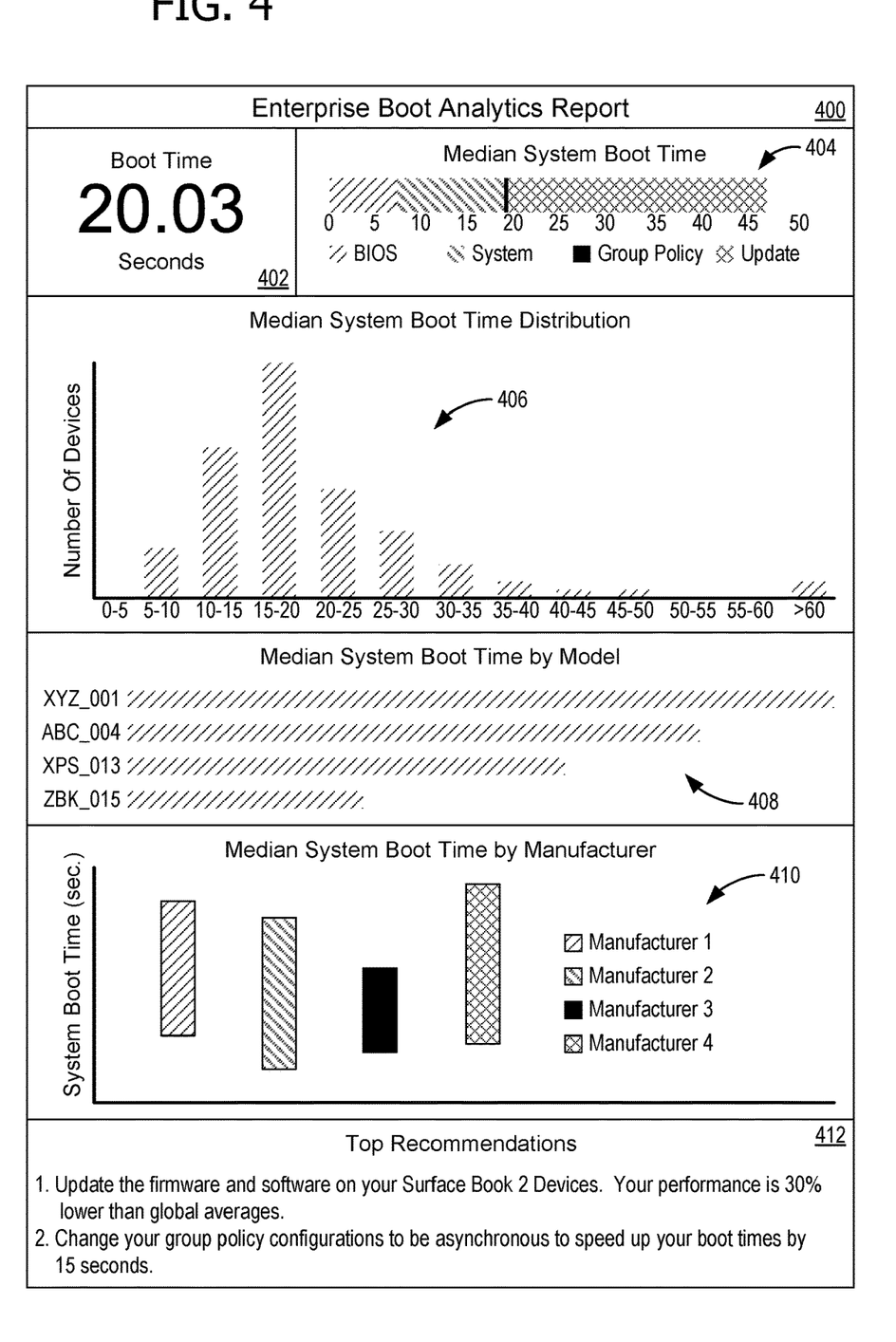
FIG. 4 shows an exemplary report generated by the selection engine of FIG. 2.
Figure 5:
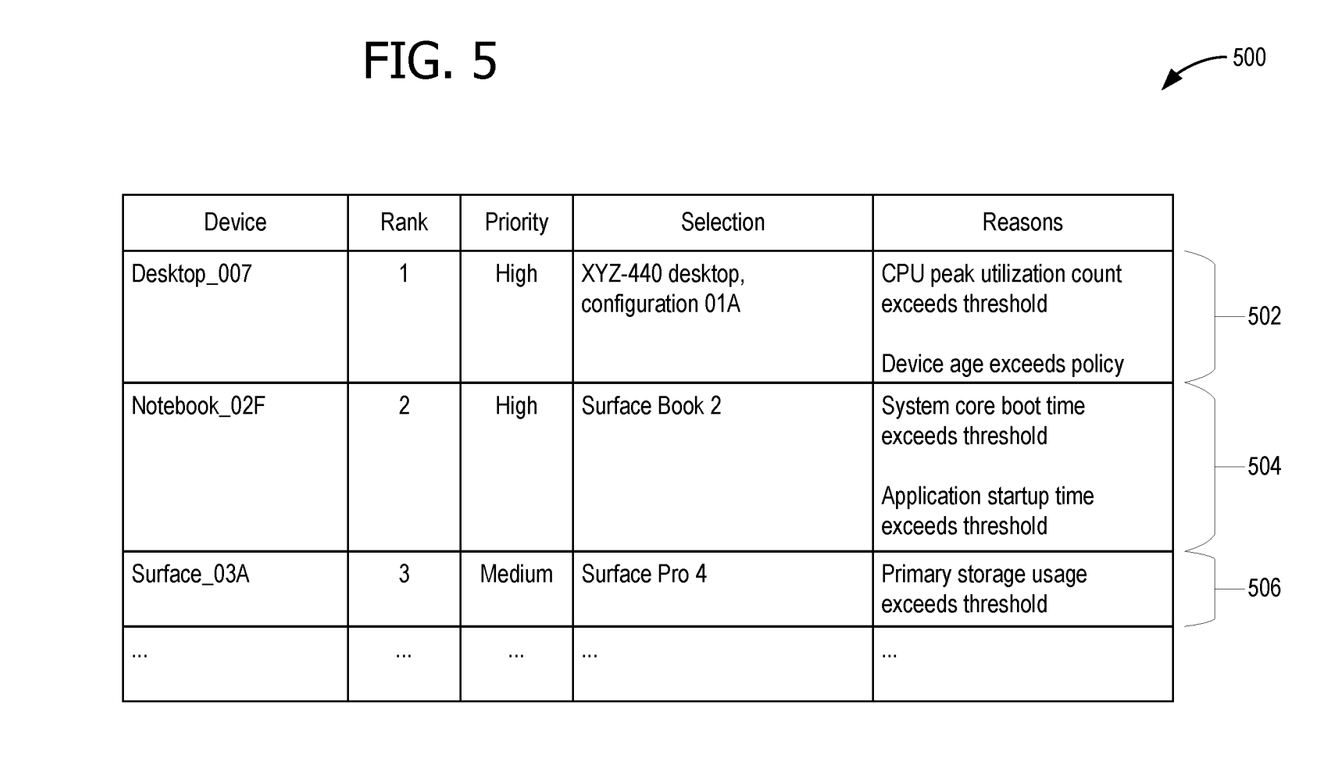
FIG. 5 shows another exemplary report generated by the selection engine of FIG. 2.

Selection engine 200 uses collected data 230, hardware baselines 234, enterprise policies 236, curated replacement list 238 (hardware baselines 234, enterprise policies 236, and curated replacement list 238 together form enterprise data), and global hardware baselines 240 to generate a report 140, which is described in more detail in relation to FIGS. 4 and 5. Some examples of report 140 include a ranked list of computing devices to replace, or other remedial operations, such as updating software or changing a boot or startup process. Some examples of hardware baselines 234 include information such as hardware and software inventories, computing device hardware manufacturer and model, computing device age, memory, CPU identification, harddrive identification, network capability and interface identification, attached peripherals, OS version, installed application list, and boot configuration. Some examples of enterprise policies 236 include specific policies on hardware replacement (e.g., hardware must not be replaced within the first year of use or must be replaced after 5 years regardless of current use), certain job positions receive better-performing computers, and certain job positions receive notebook computers while others receive desktop computers. For example, engineers often require higher speed and more memory to run complex software.

Curated replacement list 238 includes hardware baselines from which selection engine 200 selects a new (or recycled) hardware configuration to replace computing devices that require replacement. In some examples, an IT administrator can limit the set of replacement hardware solutions by manufacturer or some other criteria such as price. In some examples, rather than merely replacing hardware, software or other changes may be selected as a radiation operation. In some examples, the selection of a replacement computing device or another remediation operation is based at least on the usability score. The usability score indicates whether a computing device is sufficient for the current user. This permits identifying users having poor experiences and selecting new hardware for them by matching their usage characteristics to the profiles generated for the curated replacement list 238. In order to create a prioritized set of computing devices to replace, usability scores are ranked and enterprise policies 236 are applied in operation to remove or add computing devices (e.g., some computing devices are too new or too old). A remediation threshold is determined from enterprise policies 236 to identify those computing devices for which a remediation solution is suggested and/or required.

Selection engine 200 determines whether updating software or changing a boot or startup process will suffice to bring the usability score into an acceptable range, according to enterprise policies 236, or whether replacement is actually needed. Enterprise policies 236 are applied again to select specific hardware configurations for those computing devices actually requiring replacement (e.g., some job functions receive notebook computers, whereas other job functions receive desktop computers). Anticipated usability scores are determined and tested, and if not acceptable, another solution is tried and tested. To accomplish this, a set of devices that match the current device's usage profile (e.g., with similar application usage and configuration) is referenced from global hardware baselines 240. For example, if the user runs two primary applications, and the anticipated usability score is desired for a particular device on curated replacement list 238, then the anticipated usability score is calculated by averaging the usability scores for other similarly configure hardware devices in all global hardware baselines 240 for other users having similar application usage profiles.

To perform these operations, selection engine 200 uses application logic and data 202. Collected data 230 is converted into metric data 204. Weights 206 are applied to metric data 204 (e.g., processed collected data 230) to produce usability scores 208. In some examples, a machine learning (ML) component 214 determines weights 206 based on actual feedback in training data 216 (e.g., key inputs and feedback), such as by matching whether a set of usability scores matches reported human perceptions regarding whether certain computing devices were operating at acceptable levels of performance. In some examples, a set of rules is used, rather than ML. A remediation operation list and generation component 212 imports curated replacement list 238 and is used to populate results 210 with score improvement selections. In some examples, ML component 214 (using ML model 218) is used to determine whether the score improvement is required. Some examples of training data 216 include usability scores and feedback regarding whether an IT administrator endorsed the remediation operation selected by selection engine 200. Other logic and data 220 provide additional functionality and information necessary to carry out the functions described herein for selection engine 200.

Thus, selection engine 200 is operative to: receive collected data 230 and enterprise data (hardware baselines 234 and enterprise policies 236); determine, based at least on collected data 230, a usability score 208, wherein determining usability score 208 comprises performing a weighted calculation (using weights 206) on the collected data; determine, based at least on usability score 208 and the enterprise data, whether a score improvement is required; determine, based at least on the enterprise data, a score improvement selection; report (via report 140) a score improvement selection, based at least on the enterprise data and determining that a score improvement is required. In some examples, collected data 230 includes boot performance, application performance, and hardware performance, wherein the boot performance data includes core boot time. In some examples, the application performance data includes application startup time, the application startup time is not measured for at least one background process, and/or the application startup time is measured by detecting that a new application window has opened. Based at least on detecting that a new application window has opened, the start time of the process that spawned the new application window is determined.

In some examples, the hardware performance data includes at least one data item selected from the list consisting of: a processor utilization exceeding a threshold and a memory utilization exceeding a threshold. Other hardware performance data is contemplated. Collected data 230 may further comprise at least one data item selected from the list consisting of: login time, battery warning history, storage I/O performance, and network I/O performance. Other collected data is contemplated. In some examples, the score improvement selection comprises at least one remediation operation selected from the list consisting of: identification of a new hardware configuration to replace the first computing device, updating software, and changing a boot or startup process. Other remediation operations are contemplated. ML component 214 (using ML model 218) may be used to determine usability score 208 or to determine whether the score improvement is required. In some examples, anonymized collected data (part of anonymized collected data 232) for a computing device (user device 122) is received from performance monitor agent 130, and anonymized collected data for a plurality of other computing devices (also part of anonymized collected data 232) is received from a plurality of other performance monitor agents 130*a*-130*e*. Aggregate performance metrics (global hardware baselines 240) are generated from received anonymized collected data 232. In some examples, anomalous behavior of a computing device (user device 122) is detected based at least on the aggregate performance metrics.

Figure 3:
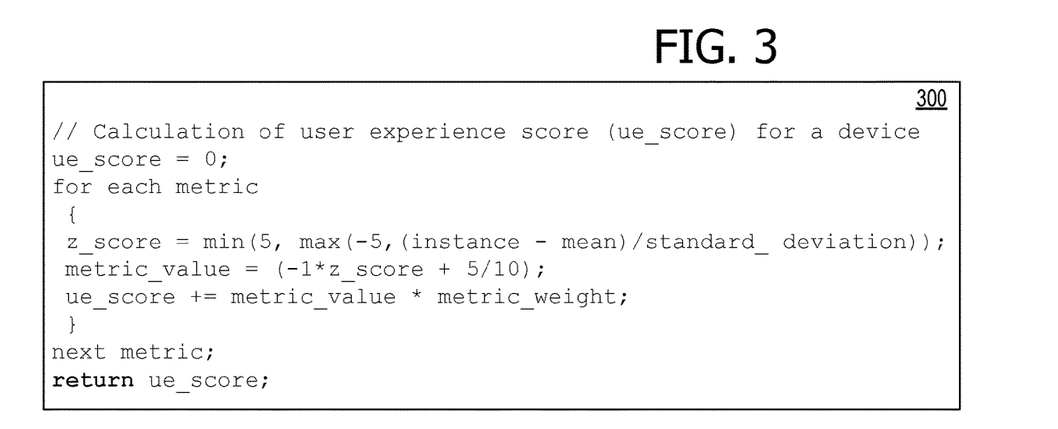
FIG. 3 shows exemplary pseudocode for a calculation performed by the selection engine of FIG. 2.

FIG. 3 shows exemplary pseudocode 300 for calculating (e.g., determining) usability scores 208 of FIG. 2. A usability score represents user experience on a particular device. In some examples, usability scores range from 0 and 100, with 100 being the best experience, and 0 being the worst. For example, if startup time is above average, the user will perceive a poor experience, whereas a faster-than-average startup time will provide the user with a better experience. Pseudocode 300 relies upon normalized metrics data 204 (e.g., when collected data 230 is converted into metric data 204, "better" values are converted into lower metric numbers). In some examples, metric data 204 contains the instance data for particular devices (e.g., core boot time is 5 seconds); global means (e.g., average core boot time is 10 seconds); and global standard deviation (e.g., the standard deviation of boot times for all devices is 2.1 seconds). Weights 206, that are applied to metric data 204, indicate the significance of a metric for users' perceptions of the experiences with the computing devices. In some example calculations, weights 206 sum to 1.0. For example, with three metrics, the weights could be boot time=0.1, application start time=0.4, and battery life=0.5.

The specific calculation is shown in pseudocode 300 and repeated below. The ue_score is the usability score, which is stored in results 210 (of FIG. 210).

```
ue_score = 0;
for each metric
    {
    z_score = min(5, max(-5,( instance - mean ) / standard deviation ));
    metric_value = (-1*<z_score> + 5/10);
    ue_score += metric_value * metric_weight;
    }
next metric;
return ue_score;
```

Some examples use alternative calculations of usability scores. For example, instead of a linear association between z-score and user experience (ue_score), an exponential relationship is used (e.g. twice as slow worsens the usability score by a factor of four). Another example uses an expectation of a time (boot time or application startup time), rather than a calculated mean. This would reduce usability scores for computing devices that took longer than a user's expectation to perform a task, even if the particular computing device is performing at an above-average speed. Other variations are also possible.

FIG. 4 shows an exemplary report 400 generated by selection engine 200 (of FIGS. 1 and 2). That is, report 400 is one of multiple possible versions of report 140 generated using metric data 204 and results 210. Report 400 shows aggregated results for multiple computing devices and has a boot time reporting window 402 and a bar graph 404 segmented into various boot stages. In some examples, boot time reporting window 402 and bar graph 404 report the boot time results for a particular computing device, whereas for other examples, boot time reporting window 402 and bar graph 404 report mean, median, or mode boot time results for a plurality of computing devices. Report 400 also has a histogram 406 of boot time results, so that the typical user experience, as well as outliers, can be observed. Histogram 406 shows the number of devices having a system boot time measured in seconds, within each of the bins indicated. A comparison bar graph 408 illustrates boot time results grouped by computing device model, although other groupings can also be shown. A plot 410 shows variances of boot times by computing device manufacturer, although other groupings can also be used. Comparison bar graph 408 and plot 410 can be used for purchasing decisions, for example by identifying which manufacturer's devices and which computing device models tend to perform better or worse. It should be understood that other performance metrics (e.g., processor utilization and memory utilization) can be compared with other examples of report 400. A recommendations list 412 identifies remediation operation selections; specifically, recommendations list 412 identifies remediation operation selections as updating software and firmware, and changing a boot or startup process to be asynchronous.

FIG. 5 shows an alternative exemplary report 500 generated by selection engine 200. That is, report 500 is another one of the multiple possible versions of report 140 generated using metric data 204 and results 210. Report 500 is a table showing ranked and prioritized remediation operation selections. In report entry 502, a computing device identified as "Desktop_007" is suggested for replacement with another device that has been selected from a curated list of replacement options. That is, report entry 502 identifies a new hardware configuration to replace the "Desktop_007" computing device, and also provides reasons for the selection. Report entries 504 and 506 show other ranked and prioritized remediation operation selections for other computing devices, and other report entries. Other report content and versions are used in other examples. A Recycle Report identifies which computing devices that are slated for replacement can be recycled for other users that have even lesser-capable machines. For example, a program manager's computing device is selected for refreshing and provisioning for a sales representative. An Underperforming Hardware Report lists underperforming hardware that could possibly be brought up to a better performance level by wiping the storage and reinstalling the OS and software. Other alternative reports are also used, in some examples.

Figure 6:
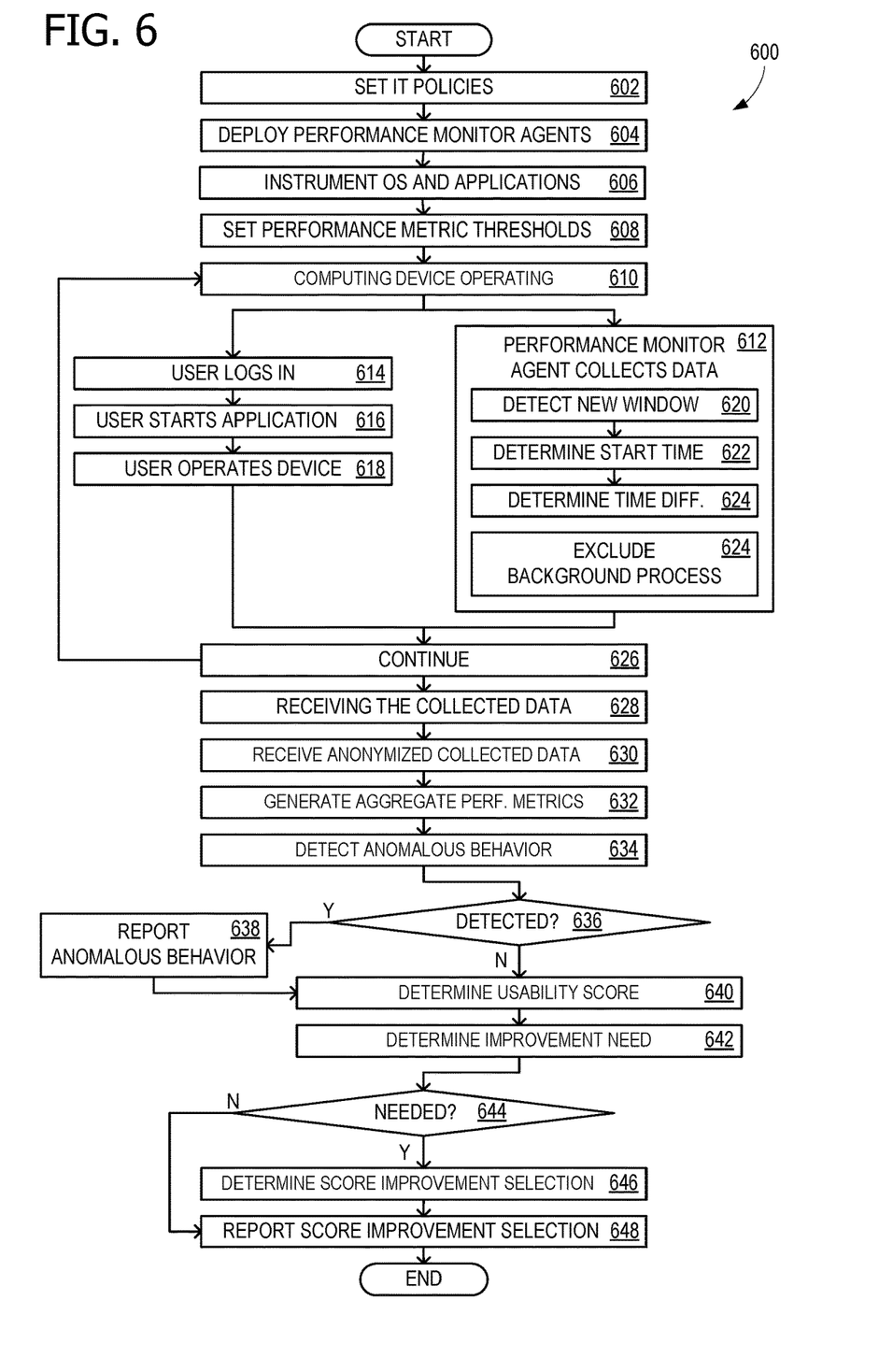
FIG. 6 is a flow chart illustrating exemplary operations involved in optimizing hardware replacement using performance analytics.

FIG. 6 is a flow chart 600 illustrating exemplary operations involved in optimizing hardware replacement using performance analytics. In some examples, operations described for flow chart 600 are performed by computing device 700 of FIG. 7. Flow chart 600 commences in operation 602 with an IT administrator in a customer environment setting IT policies for computing devices within the IT administrator's purview. Performance monitor agents are deployed in operation 604, for example by installing them on multiple computing devices. In operation 606, a performance monitor agent on a user's computing device (e.g., user device 122 of FIG. 1) instruments the OS and selected applications. Performance metric thresholds are set in operation 608, such as processor utilization, memory utilization, storage utilization, battery life, and others.

Computing device usage with the performance monitor agent commences in operation 610, for example, by the computing device powering up or rebooting. The performance monitor agent begins collecting data in operation 612. The collected data includes boot performance, application performance, and hardware performance and enterprise data. In some examples, the boot performance data includes core boot time. In parallel with operation 612, the user logs in during operation 614, starts an application in operation 616, and operates the computing device in operation 618. During this, the performance monitor agent continues collecting data in operation 612. In some examples, the collected application performance data includes application startup time. In some examples, application startup time is measured using operations 620-624. Operation 620 includes detecting that a new application window has opened. Operation 622 includes, based at least on detecting that a new application window has opened, determining a start time of a process that spawned the new application window. Operation 624 includes determining the application startup time based at least on the time difference between the start time and the opening of the window for the application process.

In some examples, operation 624 excludes some background processes so that the application startup time is not measured for at least one background process. In some examples, hardware performance data includes at least one data item selected from the list consisting of: a processor utilization exceeding a threshold and a memory utilization exceeding a threshold. In some examples, the collected data further comprises at least one data item selected from the list consisting of: login time, battery warning history, storage input/output (I/O) performance, and network I/O performance. Operation 626 continues collecting data from the computing device as the user operates it on an ongoing basis, for example in performance of work duties during the time that the user is assigned the computing device by the IT administrator.

Turning to the analytics service (e.g., analytics service 102 of FIG. 1), operation 628 includes receiving enterprise data and the collected data from the instrumented OS on the computing device, the collected data including boot performance, application performance, and hardware performance. Operation 630 includes receiving, from the performance monitor agent, anonymized collected data for the computing device, and also includes receiving, from a plurality of other performance monitor agents, anonymized collected data for a plurality of other computing devices. In some examples, the data is received in an anonymized state, and in other examples, the received data is anonymized by a first function of the analytics service (e.g., data processor 108 of FIG. 1) and received as anonymized by a second function of the analytics service (e.g., selection engine 200 of FIGS. 1 and 2). Operation 632 includes generating, from the received anonymized collected data, aggregate performance metrics, and operation 634 includes detecting, based at least on the aggregate performance metrics, anomalous behavior of the computing device. If, in decision operation 636, anomalous behavior is detected, then operation 638 includes reporting the anomalous behavior of the computing device.

Operation 640 includes determining, based at least on the collected data, a usability score, wherein determining the usability score comprises performing a weighted calculation on the collected data. Some examples use an ML component to determine the usability score. Operation 642 includes determining, based at least on the usability score and the enterprise data, whether a score improvement is required. Some examples use an ML component to determine whether the score improvement is required. If, in decision operation 644, a score improvement is required, then operation 646 includes determining, based at least on the enterprise data, the score improvement selection. In some examples, the score improvement selection comprises at least one remediation operation selected from the list consisting of: identification of a new hardware configuration to replace the first computing device, updating software, and changing a boot or startup process. Other remediation operations are contemplated.

Figure 6A:
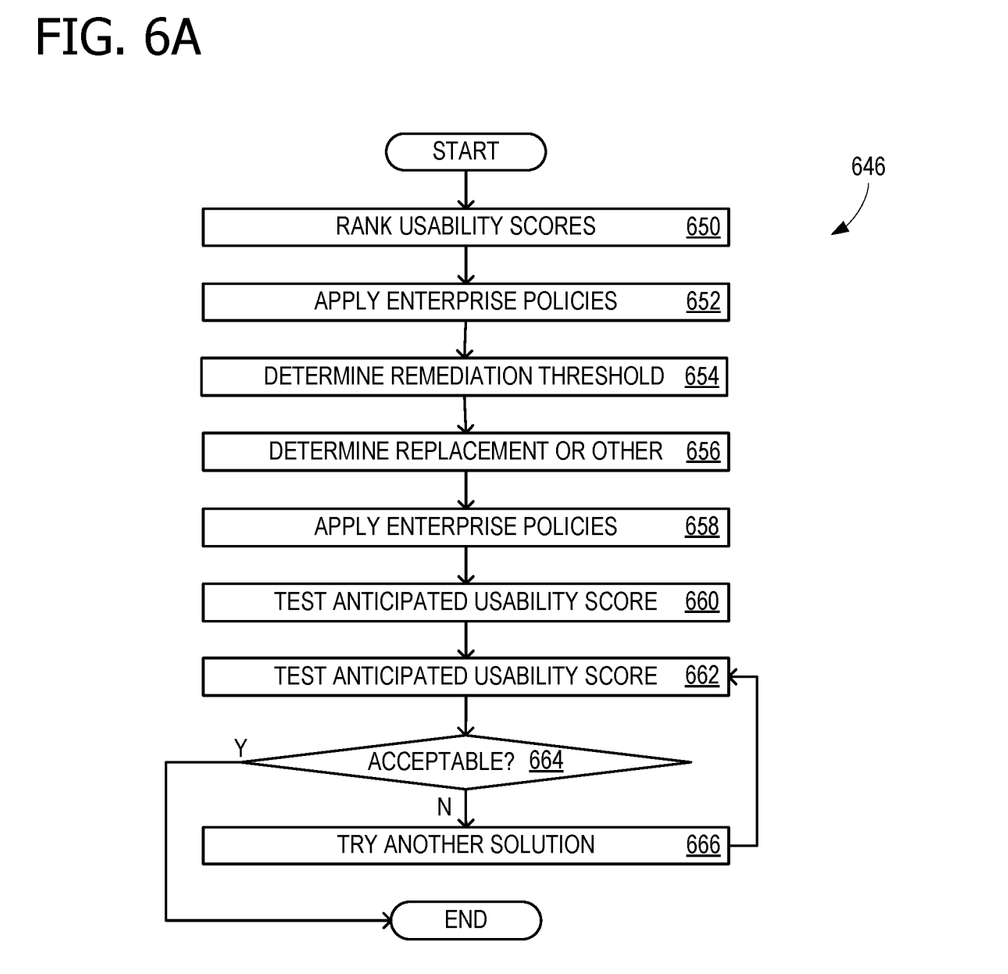
FIG. 6A is a flow chart illustrating additional detail for the flow chart of FIG. 6.

Referencing FIG. 6A, to create a prioritized set of computing devices to replace, usability scores are ranked in operation 650, and enterprise policies are applied in operation 652 to remove or add computing devices (e.g., some computing devices are too new or too old). A remediation threshold is determined in operation 654, to identify those computing devices for which a remediation solution is required. Operation 656 determines whether updating software or changing a boot or startup process will suffice, or whether replacement is actually needed. Enterprise policies are applied again in operation 658 to select specific hardware configurations, in operation 660, for those computing devices actually requiring replacement (e.g., some job functions receive notebook computers, whereas other job functions receive desktop computers). Anticipated usability scores are determined and tested in operation 662, and if not acceptable, according to decision operation 664, another solution is tried in operation 660 before returning to operation 662. Returning to FIG. 6, operation 648 then includes reporting a score improvement selection, based at least on the enterprise data and determining that a score improvement is required.

Additional Examples

Some aspects and examples disclosed herein are directed to a system for optimizing hardware replacement comprising: a first performance monitor agent operative to: collect data from an instrumented OS on a first computing device, the collected data including boot performance, application performance, and hardware performance; and a selection engine that is operative to: receive the collected data and enterprise data; determine, based at least on the collected data, a usability score, wherein determining the usability score comprises performing a weighted calculation on the collected data; determine, based at least on the usability score and the enterprise data, whether a score improvement is required; determine, based at least on the enterprise data, a score improvement selection; and report the score improvement selection, based at least on determining that a score improvement is required.

Additional aspects and examples disclosed herein are directed to a method of optimizing hardware replacement comprising: receiving enterprise data and collected data from an instrumented OS on a first computing device, the collected data including boot performance, application performance, and hardware performance; determining, based at least on the collected data, a usability score, wherein determining the usability score comprises performing a weighted calculation on the collected data; determining, based at least on the usability score and the enterprise data, whether a score improvement is required; determining, based at least on the enterprise data, a score improvement selection; and reporting the score improvement selection, based at least on determining that a score improvement is required.

Additional aspects and examples disclosed herein are directed to one or more computer storage devices having computer-executable instructions stored thereon for optimizing hardware replacement, which, on execution by a computer, cause the computer to perform operations comprising: receiving enterprise data and collected data from an instrumented OS on a first computing device, the collected data including boot performance, application performance, and hardware performance, wherein the boot performance data includes core boot time, wherein the application performance data includes application startup time, wherein the application startup time is not measured for at least one background process; wherein the application startup time is measured by: detecting that a new application window has opened; and based at least on detecting that a new application window has opened, determining a start time of a process that spawned the new application window; and wherein the hardware performance data includes at least one data item selected from the list consisting of: a processor utilization exceeding a threshold and a memory utilization exceeding a threshold; determining, based at least on the collected data, a usability score, wherein determining the usability score comprises performing a weighted calculation on the collected data; determining, based at least on the usability score and the enterprise data, whether a score improvement is required; determining, based at least on the enterprise data, a score improvement selection; and reporting the score improvement selection, based at least on determining that a score improvement is required, wherein the score improvement selection comprises at least one remediation operation selected from the list consisting of: identification of a new hardware configuration to replace the first computing device, updating software, and changing a boot or startup process.

Alternatively, or in addition to the other examples described herein, examples include any combination of the following:
- the boot performance data includes core boot time;
- the application performance data includes application startup time;
- the application startup time is not measured for at least one background process;
- the application startup time is measured by: detecting that a new application window has opened; and based at least on detecting that a new application window has opened, determining a start time of a process that spawned the new application window;
- the hardware performance data includes at least one data item selected from the list consisting of: a processor utilization exceeding a threshold and a memory utilization exceeding a threshold;
- the collected data further comprises at least one data item selected from the list consisting of: login time, battery warning history, storage I/O performance, and network I/O performance;
- the score improvement selection comprises at least one remediation operation selected from the list consisting of: identification of a new hardware configuration to replace the first computing device, updating software, and changing a boot or startup process;
- using an ML component to determine the usability score or to determine whether the score improvement is required;
- the selection engine is further operative to use an ML component to determine the usability score or to determine whether the score improvement is required;
- receiving, from a first performance monitor agent, anonymized collected data for the first computing device;
- receiving, from a plurality of other performance monitor agents, anonymized collected data for a plurality of other computing devices;
- generating, from the received anonymized collected data, aggregate performance metrics;
- the selection engine is further operative to: receive, from the first performance monitor agent, anonymized collected data for the first computing device; receive, from a plurality of other performance monitor agents, anonymized collected data for a plurality of other computing devices; and generate, from the received anonymized collected data, aggregate performance metrics;
- detecting, based at least on the aggregate performance metrics, anomalous behavior of the first computing device;
- reporting, based at least on detecting anomalous behavior of the first computing device, the anomalous behavior of the first computing device; and
- the selection engine is further operative to detect, based at least on the aggregate performance metrics, anomalous behavior of the first computing device.

While the aspects of the disclosure have been described in terms of various examples with their associated operations, a person skilled in the art would appreciate that a combination of operations from any number of different examples is also within scope of the aspects of the disclosure.

Example Operating Environment

FIG. 7 is a block diagram of an example computing device 700 for implementing aspects disclosed herein, and is designated generally as computing device 700. Computing device 700 is but one example of a suitable computing environment and is not intended to suggest any limitation as to the scope of use or functionality of the examples disclosed herein. Neither should computing device 700 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 700 includes a bus 710 that directly or indirectly couples the following devices: computer-storage memory 712, one or more processors 714, one or more presentation components 716, I/O ports 718, I/O components 720, a power supply 722, and a network component 724. While computer device 700 is depicted as a seemingly single device, multiple computing devices 700 may work together and share the depicted device resources. For example, memory 712 may be distributed across multiple devices, and processor(s) 714 may be housed with different devices.

Bus 710 represents what may be one or more busses (such as an address bus, data bus, or a combination thereof). Although the various blocks of FIG. 7 are shown with lines for the sake of clarity, delineating various components can be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 7 and the references herein to a "computing device." Memory 712 may take the form of the computer-storage media references below and operatively provide storage of computer-readable instructions, data structures, program modules and other data for the computing device 700. In some examples, memory 712 stores one or more of an operating system, a universal application platform, or other program modules and program data. Memory 712 is thus able to store and access instructions configured to carry out the various operations disclosed herein.

In some examples, memory 712 includes computer-storage media in the form of volatile and/or nonvolatile memory, removable or non-removable memory, data disks in virtual environments, or a combination thereof. Memory 712 may include any quantity of memory associated with or accessible by the computing device 700. Memory 712 may be internal to the computing device 700 (as shown in FIG. 7), external to the computing device 700 (not shown), or both (not shown). Examples of memory 712 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 700. Additionally, or alternatively, the memory 712 may be distributed across multiple computing devices 700, for example, in a virtualized environment in which instruction processing is carried out on multiple devices 700. For the purposes of this disclosure, "computer storage media," "computer-storage memory," "memory," and "memory devices" are synonymous terms for the computer-storage memory 712, and none of these terms include carrier waves or propagating signals.

Processor(s) 714 may include any quantity of processing units that read data from various entities, such as memory 712 or I/O components 720. Specifically, processor(s) 714 are programmed to execute computer-executable instructions for implementing aspects of the disclosure. The instructions may be performed by the processor, by multiple processors within the computing device 700, or by a processor external to the client computing device 700. In some examples, the processor(s) 714 are programmed to execute instructions such as those illustrated in the flow charts discussed below and depicted in the accompanying drawings. Moreover, in some examples, the processor(s) 714 represent an implementation of analog techniques to perform the operations described herein. For example, the operations may be performed by an analog client computing device 700 and/or a digital client computing device 700.

Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 700, across a wired connection, or in other ways. I/O ports 718 allow computing device 700 to be logically coupled to other devices including I/O components 720, some of which may be built in. Example I/O components 720 include, for example but without limitation, a microphone, joystick, game pad, satellite dish, scanner, printer, wireless device, etc.

The computing device 700 may operate in a networked environment via the network component 724 using logical connections to one or more remote computers. In some examples, the network component 724 includes a network interface card and/or computer-executable instructions (e.g., a driver) for operating the network interface card. Communication between the computing device 700 and other devices may occur using any protocol or mechanism over any wired or wireless connection. In some examples, network component 724 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 724 communicates over wireless communication link 726 and/or a wired communication link 726a to a cloud resource 728 across network 730. Various different examples of communication links 726 and 726a include a wireless connection, a wired connection, and/or a dedicated link, and in some examples, at least a portion is routed through the internet.

Although described in connection with an example computing device 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computing system comprising:
   a memory; and
   a processor programmed to:
      receive collected data from a first computing device, the collected data including application startup time, wherein the application startup time includes a start time of a process having a new application window;
      determine, based on the collected data, a usability score, wherein the usability score comprises a weighted calculation of the collected data;
      determine, based on the usability score, a score improvement selection indicating a remediation operation; and
      cause the remediation operation to be performed.

2. The computing system of claim 1, wherein the application startup time is not measured for at least one background process.

3. The computing system of claim 1, wherein the application startup time is measured by:
   detecting that a new application window has opened; and
   based at least on detecting that a new application window has opened, determining the start time of the process that spawned the new application window.

4. The computing system of claim 1, wherein the collected data includes hardware performance data that includes at least one data item selected from a list consisting of:
   a processor utilization exceeding a threshold and a memory utilization exceeding a threshold.

5. The computing system of claim 1, wherein the selection engine is further operative to:
   receive, from a first performance monitor agent, anonymized collected data for the first computing device;
   receive, from a plurality of other performance monitor agents, anonymized collected data for a plurality of other computing devices; and
   generate, from the received anonymized collected data, aggregate performance metrics.

6. The computing system of claim 5, wherein the selection engine is further operative to:
   detect, based at least on the aggregate performance metrics, anomalous behavior of the first computing device.

7. The computing system of claim 1, further comprising replacing the first computing device.

8. The computing system of claim 1, further comprising one or more of:
   initiating replacement of the first computing device,
   initiating a software update, or
   initiating a change of at least one of a boot or startup process on the first computing device.

9. A computer-implemented method comprising:
   receiving collected data from an instrumented operating system on a first computing device, the collected data including application startup time, wherein the application startup time includes a start time of a process having a new application window;
   determining, based on the collected data, a usability score, wherein the usability score comprises a weighted calculation of the collected data;
   determining, based on the usability score, a score improvement selection; and
   reporting the score improvement selection including initiating a remediation operation to be performed.

10. The computer-implemented method of claim 9, wherein the application startup time is not measured for at least one background process.

11. The computer-implemented method of claim 9, wherein the application startup time is measured by:
  detecting that the new application window has opened; and
  based at least on detecting that the new application window has opened, determining the start time of the process that spawned the new application window.

12. The computer-implemented method of claim 9, wherein the collected data includes hardware performance data that includes at least one data item selected from a list consisting of:
  a processor utilization exceeding a threshold and a memory utilization exceeding a threshold.

13. The computer-implemented method of claim 9, wherein the collected data further comprises at least one data item selected from a list consisting of:
  login time, battery warning history, storage input/output (I/O) performance, and network I/O performance.

14. The computer-implemented method of claim 9, wherein the score improvement selection comprises the remediation operation selected from a list consisting of:
  identification of a new hardware configuration to replace the first computing device, updating software, and changing a boot or startup process.

15. The computer-implemented method of claim 9, further comprising:
  using a machine learning component to determine the usability score or to determine whether a score improvement is required.

16. The computer-implemented method of claim 9, further comprising:
  receiving, from a first performance monitor agent, anonymized collected data for the first computing device;
  receiving, from a plurality of other performance monitor agents, anonymized collected data for a plurality of other computing devices; and
  generating, from the received anonymized collected data, aggregate performance metrics.

17. The computer-implemented method of claim 16, further comprising:
  detecting, based at least on the aggregate performance metrics, anomalous behavior of the first computing device.

18. The computer-implemented method of claim 9, further comprising one or more of:
  initiating replacement of the first computing device;
  initiating a software update;
  initiating a change of at least one of a boot or startup process on the first computing device.

19. A computer storage device having computer-executable instructions stored thereon for hardware replacement, which, on execution by a computer, cause the computer to perform operations comprising:
  receiving enterprise data and collected data from an instrumented operating system on a first computing device, the collected data including one or more of the following: boot performance data, application performance data, and hardware performance data,
  wherein the boot performance data includes core boot time,
  wherein the application performance data includes application startup time,
  wherein the application startup time is not measured for at least one background process;
  wherein the application startup time is measured by:
    detecting that a new application window has opened; and
    based at least on detecting that a new application window has opened, determining a start time of a process that spawned the new application window; and
  wherein the hardware performance data includes at least one data item selected from a list consisting of:
    a processor utilization exceeding a threshold and a memory utilization exceeding a threshold;
  determining, based at least on the collected data, a usability score, wherein determining the usability score comprises performing a weighted calculation on the collected data;
  determining, based at least on the enterprise data, a score improvement selection;
  reporting the score improvement selection, wherein the score improvement selection comprises at least one remediation operation selected from a list consisting of:
    identification of a new hardware configuration to replace the first computing device, updating software, and changing a boot or startup process; and
  causing the at least one remediation operation to be performed.

20. The computer storage device of claim 19, wherein the operations further comprise:
  using a machine learning component to determine the usability score or to determine whether the score improvement selection is required;
  receiving, from a first performance monitor agent, anonymized collected data for the first computing device;
  receiving, from a plurality of other performance monitor agents, anonymized collected data for a plurality of other computing devices;
  generating, from the received anonymized collected data, aggregate performance metrics; and
  detecting, based at least on the aggregate performance metrics, anomalous behavior of the first computing device; and
  wherein the collected data further comprises at least one data item selected from a list consisting of:
    login time, battery warning history, storage input/output (I/O) performance, and network I/O performance.

* * * * *